March 27, 1945.  A. C. PURPURA  2,372,291
AIRCRAFT
Filed Dec. 27, 1943  3 Sheets-Sheet 1

Inventor:
August C. Purpura,
By: Wm. F. Freudenreich,
Attorney.

March 27, 1945.  A. C. PURPURA  2,372,291

AIRCRAFT

Filed Dec. 27, 1943  3 Sheets-Sheet 3

Inventor
August C. Purpura,
By Wm. F. Freudenreich,
Attorney

Patented Mar. 27, 1945

2,372,291

UNITED STATES PATENT OFFICE 2,372,291

AIRCRAFT

August C. Purpura, Chicago, Ill.

Application December 27, 1943, Serial No. 515,725

2 Claims. (Cl. 244—20)

Aircraft of the helicopter type are useful in a limited field because of their ability to move straight up and down, even though in nearly every other respect the ordinary aeroplane is far superior. The present invention has for its object to produce a simple and novel craft which shall be able to move vertically, as does the helicopter, and shall be far more effective and efficient than the latter in other respects, thereby assuring an unlimited field of usefulness for the same.

In the preferred embodiment of my invention I can employ any known type of fuselage, omitting the wings and propeller and substituting therefor a pair of simple rotors; controlling means being provided to cause the craft to rise vertically, move straight ahead, or move up and forward at any desired angle to the horizontal. In case of engine failure the rotors, influenced by these same controlling means, insure a safe landing.

Figure 1:
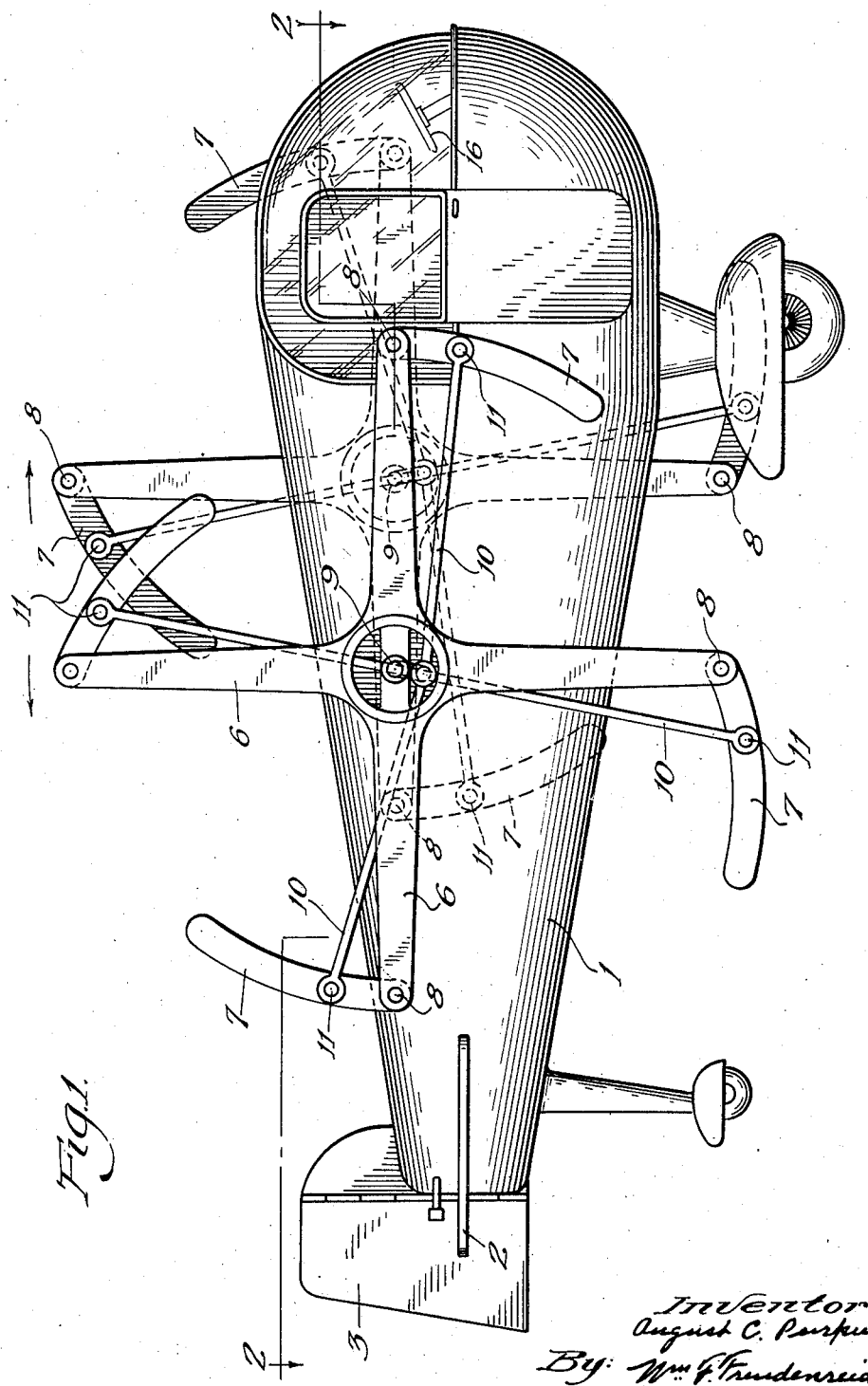
Figure 2:
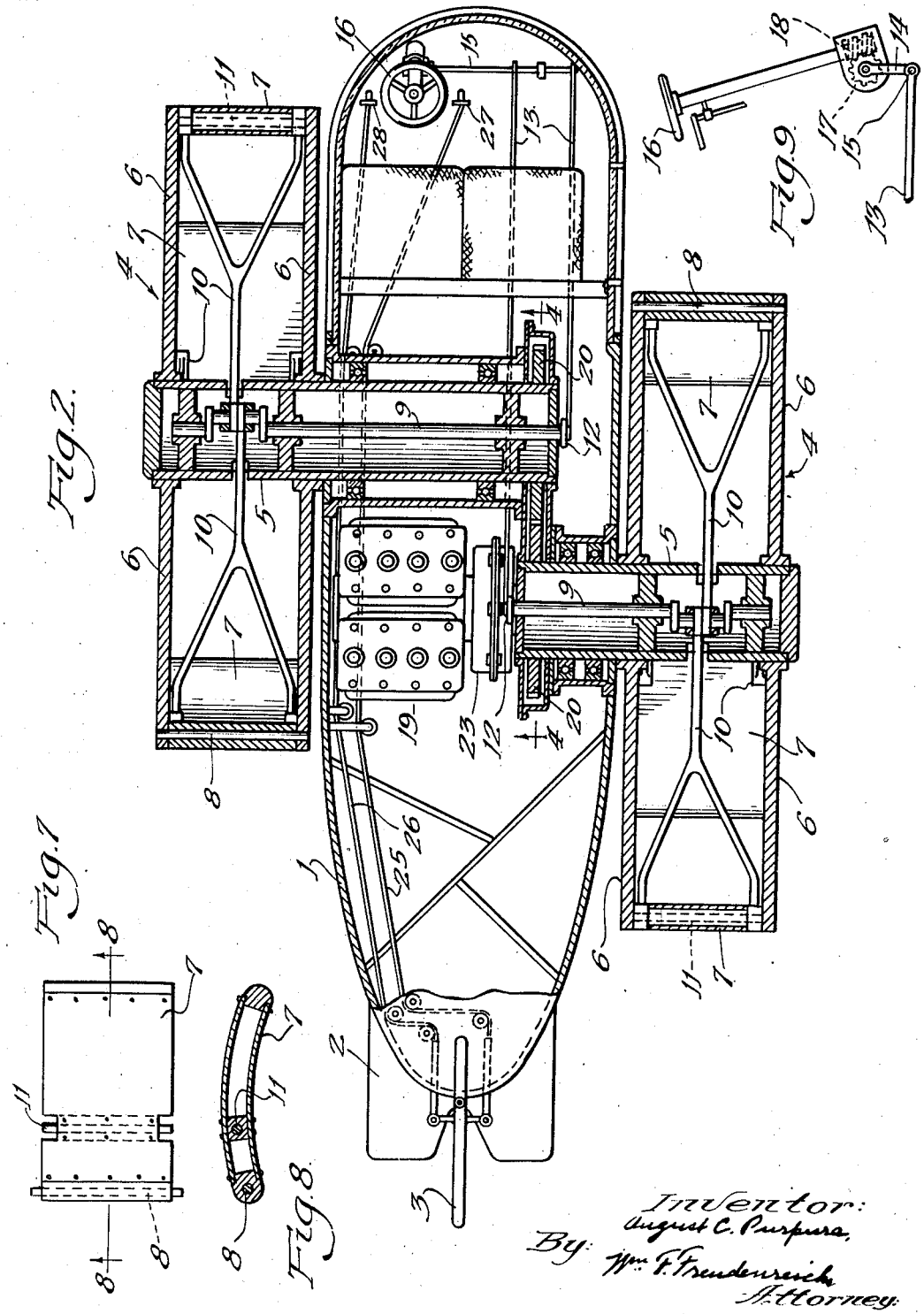
Figure 3:
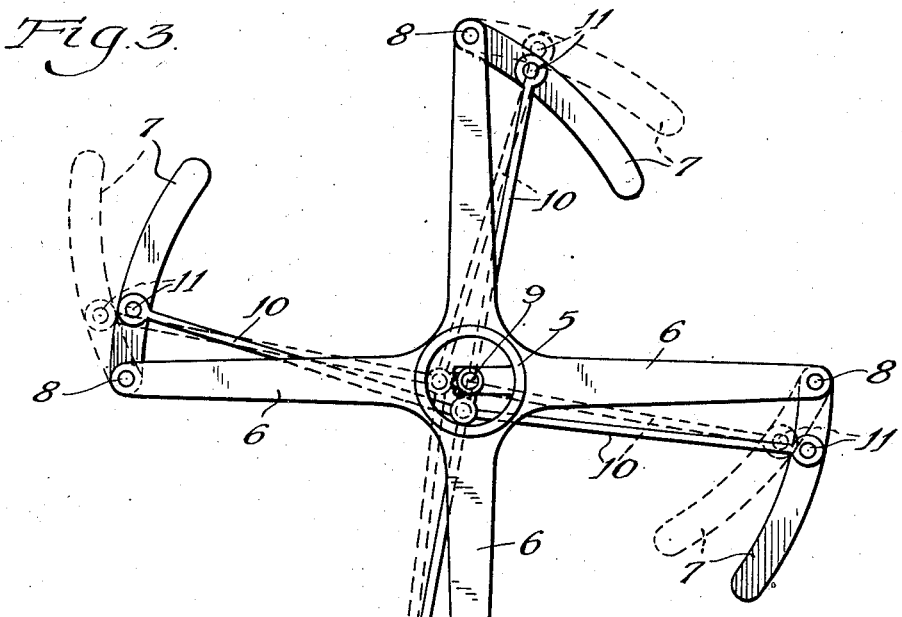
Figure 4:
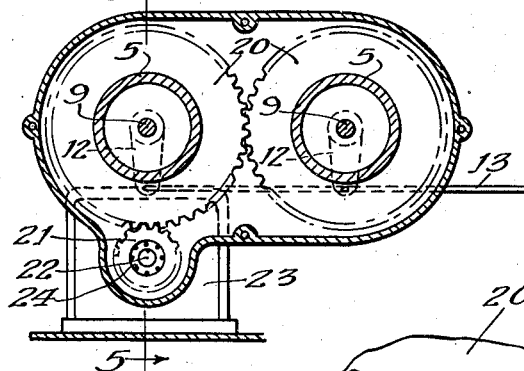
Figure 5:
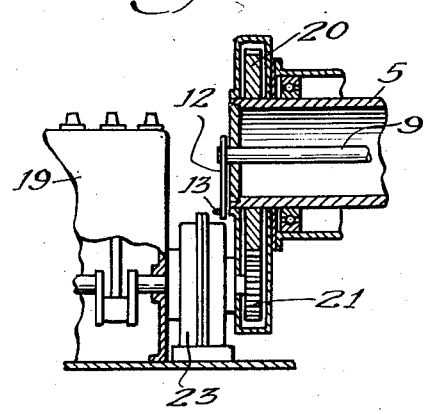
Figure 6:
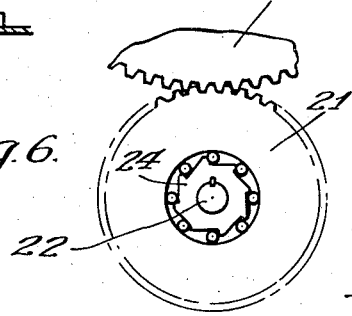

The various features of novelty whereby my invention is characterized will hereinafter be pointed out with particularity in the claims; but, for a full understanding of the invention and of its various objects and advantages, reference may be had to the following detailed description taken in connection with the accompanying drawings, wherein:

Figure 1 is a side view of a machine, embodying the present invention, in the act of rising vertically; Fig. 2 is a section on line 2—2 of Fig. 1; Fig. 3 is a side view of one of the rotors, illustrating the vanes or aerofoils in full lines set for a straight lift and in dotted lines as set for driving the machine ahead; Fig. 4 is a section on line 4—4 of Fig. 2; Fig. 5 is a section on line 5—5 of Fig. 4; Fig. 6 is a view similar to Fig. 4, showing only, on a larger scale, the free wheeling device; Fig. 7 is a top plan view of one of the vanes or aerofoils; Fig. 8 is a section on line 8—8 of Fig. 7; and Fig. 9 is a side view of the main controller.

In the drawings 1 represents any usual or suitable fuselage having at the tail a horizontal stabilizer 2 and vertical rudder 3. On each side of the fuselage is a rotor 4 mounted to turn on a transverse horizontal axis. The rotors are not coaxial but one is well in front of the other. The axis of one rotor is preferably ahead of the center of gravity of the machine while the axis of the other is in rear of the center of gravity. The reason for disposing the rotors in this manner is to suspend the fuselage in such a way that the effect is the same as a three or four point support; the fuselage being stable and having no tendency to revolve about either a transverse axis passing through the center of gravity or about its longitudinal axis. Each rotor consists of a tubular shaft 5 of large diameter, a plurality of spoke-like arms 6, and a vane 7 mounted on the outer end of each arm. Each vane takes generally the shape of a longitudinal section of a cylindrical shell whose radius is equal to the length of the arms or spokes, and it is attached at one long edge to the corresponding arm or spoke by a hinge 8 whose axis is parallel to the axes of the rotors. Within and coaxial with each tubular shaft is a crank shaft 9 so supported that it may be held in a stationary position while the rotor is rotating. Each vane is connected with a crank on the corresponding crank shaft by a connecting rod 10 that is fastened to the vane at some distance from the hinge 8 by a hinge pin 11. Each crankshaft has on its end, beyond the inner end of the tubular shaft in which it is mounted, a rigid radial arm 12. A rod 13 is fastened to each arm 12 and extends forward to the pilot's compartment where it is in turn attached to a radial arm 14 on a transverse rock shaft 15. This rock shaft is adapted to be turned and locked in any angular position into which it may be brought by a controlling member operated by the pilot. In the arrangement shown, there is in the pilot's compartment a device like the steering post in an automobile, provided at the top with a wheel 16 to be grasped and turned by the pilot. A worm wheel 17 on the rock shaft and a worm 18 on the shaft that carries the wheel 16 cooperate to lock the rock shaft in any position which it may at any time be occupying and to turn the rock shaft whenever the hand wheel is turned.

The rotors are driven by a motor 19 mounted in the fuselage behind the forward tubular shaft and beside the inner end of the rear tubular shaft. The tubular shafts are geared together, so as to run in opposite directions, by gear wheels 20, as best seen in Fig. 4. One of these gear wheels meshes with a pinion 21, as shown in Figs. 4-6, which pinion is mounted on a shaft 22 driven by the motor through a suitable fluid drive 23 such as is commonly used, for example, in automobiles. The pinion is free-wheeling on the shaft 22, namely, there is a clutch 24 between wheel and shaft that permits free relative movement in one direction but not in the other.

The rudder 3 may be operated in any suitable way. In the arrangement shown, it is connected by cables 25 and 26 to a pair of pedals, 27 and 28, respectively, in front of the pilot's seat.

In Fig. 1 the machine is shown as being in the air and as moving upward. The vanes which are at the top and at the bottom are at their greatest angles of incidence or attack for lifting the machine when the rotors are rotating in the direction of the arrows; the vanes at the ends of the horizontal arms of the rotors being now concentric with the respective axes of the rotors. As the rotors turn from their indicated positions, the angle of incidence of the top and bottom vanes decreases during the first ninety degrees and increases during the next ninety degrees. Any tendency of one rotor to turn the machine or drive it forward or backward is offset by the other rotor. By turning the controlling crankshafts, the vanes may be shifted to vary their angles of attack with respect to a given plane. The two extremes are shown in Fig. 3, wherein the vanes appear in full lines in the same setting as in Fig. 1; whereas the setting in broken lines is that in which the maximum effort is exerted in the direction to drive the machine ahead. Obviously, any intermediate setting, between these two extremes, may be achieved so as to exert the maximum driving effort at any angle in the forward and upward direction. Consequently, the machine may rise vertically and then level off for horizontal flight, or it may at any time travel up and forward at any desired angle.

Turning movements are effected by shifting the rudder by means of the pedals.

I prefer that the axes of the rotors be located in a plane containing the center of gravity of the machine so that the resultant force of both rotors will always be applied at the center of gravity and thus insure stability.

In the event of engine failure during flight, the rotors make it possible to descend safely in the same way as an ordinary landing is made, the pilot needing only properly to turn the control wheel.

By reason of the flexible drive between the motor and the rotors, including the fluid drive and free wheeling, the power of the motor is delivered to the rotors smoothly and efficiently, without the presence of any rigid connections which might endanger the safety of the whole machine and its occupants.

It will thus be seen that I have produced an aircraft which is extremely simple in construction, which can be produced at a low cost, which is easily operated, which can rise and descend without forward movement, which requires only a small space for landing or take-off, and which is efficient and safe in use. It will also be seen that with a single type of rotor flight in the vertical or horizontal direction, or at any angle to these directions may be carried out without producing any drag that would result in a loss of speed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a fuselage, two rotors mounted one on each side of the fuselage for rotation about a horizontal transverse axis, the axes of the rotors being parallel to each other and spaced a substantial distance apart in the direction of the length of the fuselage, means to drive the rotors in a manner to cause them to turn oppositely to each other, each rotor having a plurality of vanes distributed about its axis and each hinged for swinging movements about an axis parallel to that axis, means to cause the angle of incidence of each vane to vary from maximum values at predetermined diametrically-opposed points in each revolution of its rotor to zero at other points, and means to control the aforesaid means to cause the said predetermined points to be shifted at will angularly about the axes of the rotors.

2. A machine of the character described in claim 1 wherein the axes of rotation of the rotors are in a plane containing the center of gravity of the machine and are located one in front of and the other behind said center of gravity.

AUGUST C. PURPURA.